(12) United States Patent
Caesar et al.

(10) Patent No.: US 9,623,355 B2
(45) Date of Patent: Apr. 18, 2017

(54) FILTER ELEMENT WITH FILTER POCKETS

(71) Applicant: CARL FREUDENBERG KG, Weinheim (DE)

(72) Inventors: Thomas Caesar, Weinheim (DE); Mark Stiborsky, Weinheim (DE); Heiko Manstein, Speyer (DE); Steffen Grunz, Ilvesheim (DE)

(73) Assignee: CARL FREUDENBERG KG, Weinheim (DE)

( * ) Notice: Subject to any disclaimer, the term of this patent is extended or adjusted under 35 U.S.C. 154(b) by 65 days.

(21) Appl. No.: 14/405,809

(22) PCT Filed: May 22, 2013

(86) PCT No.: PCT/EP2013/001511
§ 371 (c)(1),
(2) Date: Dec. 5, 2014

(87) PCT Pub. No.: WO2013/185878
PCT Pub. Date: Dec. 19, 2013

(65) Prior Publication Data
US 2015/0174518 A1    Jun. 25, 2015

(30) Foreign Application Priority Data
Jun. 11, 2012   (DE) .................. 10 2012 011 347

(51) Int. Cl.
*B01D 46/02*   (2006.01)
*B01D 46/00*   (2006.01)

(52) U.S. Cl.
CPC ......... *B01D 46/023* (2013.01); *B01D 46/002* (2013.01); *B01D 46/0005* (2013.01);
(Continued)

(58) Field of Classification Search
CPC .. B01D 46/002; B01D 46/0068; B01D 45/06; B01D 45/08; B01D 39/1623
(Continued)

(56) References Cited

U.S. PATENT DOCUMENTS 4,235,610 A * 11/1980 Richard ............. B01D 46/0068
                                                      55/302
5,030,261 A *  7/1991 Giusti .................. B01D 46/002
                                                      55/326
(Continued)

FOREIGN PATENT DOCUMENTS

CN           2156926       2/1994
CN         201015720       2/2008
(Continued)

OTHER PUBLICATIONS

International Search Report from corresponding PCT Appln. No. PCT/EP2013/001511 dated Jul. 22, 2013. English translation attached.

*Primary Examiner* — Duane Smith
*Assistant Examiner* — Minh-Chau Pham
(74) *Attorney, Agent, or Firm* — Grossman, Tucker, Perreault & Pfleger, PLLC

(57) ABSTRACT

The present disclosure relates to a filter element that includes a frame and bag-type filter pockets which are connected to the frame. The filter pockets have an inflow side and an outflow side, wherein at least one opening is present on the inflow side for the inlet of a fluid to be filtered by the filter pockets. The interior of each of the filter pockets tapers in the direction of their respective outflow side. Fluid-guiding elements are provided on the inflow and/or the outflow side of the filter pockets. An efficient filter element in which the fluid to be filtered is effectively cleaned is therefore provided.

13 Claims, 5 Drawing Sheets

(52) U.S. Cl.
CPC ..... *B01D 46/0043* (2013.01); *B01D 46/0045* (2013.01); *B01D 46/0049* (2013.01)

(58) Field of Classification Search
USPC ..... 55/326, 302, 318, 327, DIG. 12; 95/280, 95/268, 272
See application file for complete search history.

(56) References Cited

U.S. PATENT DOCUMENTS

| | | | | |
|---|---|---|---|---|
| 2002/0073849 A1* | 6/2002 | Buettner | ............ | B01D 39/1623 95/280 |
| 2003/0097934 A1* | 5/2003 | Bruck | .................... | B01D 45/08 95/268 |
| 2014/0208701 A1* | 7/2014 | Neu | ........................ | B01D 45/08 55/318 |
| 2014/0224123 A1* | 8/2014 | Walters | .................. | B01D 45/08 95/272 |
| 2014/0230382 A1* | 8/2014 | Fuh | ........................ | B01D 45/06 55/327 |

FOREIGN PATENT DOCUMENTS

| | | |
|---|---|---|
| CN | 201423221 | 3/2010 |
| CN | 201470245 | 5/2010 |
| CN | 101716445 | 6/2010 |
| CN | 201534033 | 7/2010 |
| CN | 201684504 | 12/2010 |
| DE | 9406822.4 | 9/1994 |
| DE | 20 2008 006 834 | 8/2008 |
| WO | 99/33544 | 7/1999 |

\* cited by examiner

FILTER ELEMENT WITH FILTER POCKETS

CROSS REFERENCE TO RELATED APPLICATIONS

This is the U.S. National Phase Application under 35 U.S.C. §371 of International Patent Application No. PCT/EP2013/001511 filed May 22, 2013, which claims the benefit of German Patent Application No. 10 2012 011 347.1 filed on Jun. 11, 2012, both of which are incorporated by reference herein.

FIELD OF THE INVENTION

The invention relates to a filter element comprising a frame and bag-like filter pockets connected thereto, wherein the filter pockets, on the inflow side, have openings so that a fluid which is to be filtered can enter into the interior spaces of the filter pockets, and wherein the interior spaces taper in the direction of an outflow side, characterized in that fluid-guiding elements are arranged on the outflow side and/or the inflow side of the filter pockets.

BACKGROUND

DE 20 2008 006 834 U1 has already disclosed a filter element which comprises a frame and bag-like filter pockets connected thereto, wherein the filter pockets, on the inflow side, have openings so that a fluid which is to be filtered can enter into the interior spaces of the filter pockets, and wherein the interior spaces taper in the direction of an outflow side.

Filter elements of this kind are used as so-called pocket filters in industrial air filtration. This use is mentioned merely by way of example.

The air which is to be filtered enters into the bag-like filter pockets via the openings and exits out of the filter pockets again on the outflow side, on a side which is directed away from the openings. The air here flows through the walls of the filter pockets, which are produced usually from nonwoven fabrics. Nonwoven fabrics are mentioned here merely by way of example. In addition to nonwoven fabrics, it is also conceivable to use other materials which hold back gas or particles.

The air is filtered as it flows through the walls. The filter pockets are of essentially V-shaped design and have their pointed ends projecting from a frame ring.

A flow field forms in the region of the pointed ends or edges, said flow field being determined essentially by the speed at which the air enters into the filter pockets and/or exits from the same.

Vortices can disadvantageously form in this flow field. These vortices result in an undesired loss in pressure at the filter element. Loss in pressure is understood to be the difference between the static pressure on the inflow side, that is to say upstream of the openings, and the static pressure on the outflow side. This loss in pressure may be up to 50%. The loss in pressure according to this description is measured in accordance with DIN EN 779.

High frictional losses may occur in the flow field as a result of the vortices. Said frictional losses result in a loss in energy and thus in a loss in pressure.

SUMMARY

It is therefore an object of the invention to specify an efficient filter element in the case of which the fluid which is to be filtered is cleaned effectively.

Up until now, it was the view among experts that there were no particularly pronounced vortex trails produced on the outflow side since air would flow along the filter pockets or the walls thereof. Therefore, up until now, the frame was optimized in aerodynamic terms on the inflow side, in order to minimize frictional losses there.

It has been found, however, within the context of the invention, that flow problems which cause a significant loss in pressure occur rather more on the outflow side. The losses in pressure on the inflow side may be categorized as being rather low in comparison. According to the invention, therefore, fluid-guiding elements are arranged on the outflow side and/or the inflow side of the filter pockets.

According to the invention, it has been found in the first instance that fluid-guiding elements can be arranged on the outflow side. It has then been found that the fluid-guiding elements have a flow-guiding action and at least partially eliminate vortices on the outflow side. Surprisingly, this reduces the loss in pressure between the inflow side and outflow side.

According to the invention, it has also been found that fluid-guiding elements can be arranged on the inflow side and/or outflow side. In particular, it has been found that the fluid-guiding elements have a flow-guiding action and at least partially eliminate vortices on the outflow side. Surprisingly, this reduces the loss in pressure between the inflow side and outflow side.

This gives rise to an efficient filter element in the case of which the fluid which is to be filtered is cleaned effectively.

Effective cleaning is understood to be cleaning of the fluid which can be carried out using the lowest possible levels of energy.

The object mentioned in the introduction is thus achieved.

Bag-like filter pockets within the context of this description are understood to be not just filter pockets which taper to a point or frustoconically, but also undulating or U-shaped bag-like filter pockets. The bag-like filter pockets may be designed to be rigid.

The fluid-guiding elements could be at least partially curved or arcuate. This can effectively limit, or prevent, vortices.

The fluid-guiding elements could be at least partially circular in cross section. Surprisingly, circular or tubular fluid-guiding elements, which adjoin the pointed ends of the filter pockets, have proven to be suitable for eliminating vortices.

The fluid-guiding elements could be designed as air baffle plates. Air baffle plates have a low weight and can easily be shaped so as to eliminate vortices.

The air baffle plates may be produced from plastics material, metal and/or some other material. The other material may comprise wood or concrete. The air baffle plates may also consist of a material composite.

The fluid-guiding elements could be configured as separate components which can be removed from the filter element or can be connected to the same. Such fluid-guiding elements may be capable of being latched or clipped to the frame.

Against this background, it is conceivable for the fluid-guiding elements to be arranged on the frame or separately from the frame, as separate components. This means that, on the one hand, the fluid-guiding elements can be connected in captive fashion to the filter element; on the other hand, the fluid-guiding elements may also be combined in modular fashion with existing filter elements from the prior art.

First fluid-guiding elements could be arranged at the outflow ends of the filter pockets and second fluid-guiding elements could be arranged as separate components between the walls and/or between the outflow ends of the filter pockets. These measures can effectively reduce vortices which form between the walls of the filter pockets.

The fluid-guiding elements and the frame could be formed in one piece and/or from the same material. This means that the unit made up of the frame and fluid-guiding elements can be easily produced and can be recycled, or disposed of, as a single-material unit.

Against this background, it is conceivable for first fluid-guiding elements to be formed from the same material as, and/or in one piece with, the frame, wherein second fluid-guiding elements are arranged as separate components.

The fluid-guiding elements could maintain a spacing of not more than 5 d from the inflow-side upper edge of the frame, where d represents the distance which runs from the inflow-side upper edge to the outflow end of the filter pockets. This then ensures that the fluid-guiding elements still influence turbulence to a sufficient extent and can reduce the same. The fluid-guiding elements, however, are spaced apart from the inflow-side upper edge of the frame by a minimum value of 0.1 d. The value 5 d is preferably 1.5 m.

The filter pockets could have folded walls, wherein the walls have pleating. The effective filter surface area of the filter element is increased by the folds or pleating. Moreover, the torsional rigidity of a filter pocket is increased. Such elements are known in air filtration as cassette filters.

A wall of a filter pocket could be formed by a flat filter element. This specific configuration allows the use of two flat folded filter elements, so-called flat filters or panel filters, in order to form a filter pocket. The flat filter elements may be connected to the frame at one end. It is possible for some or all of the fluid-guiding elements then, or beforehand, to be connected to the other ends of the flat filter elements or arranged between the same.

A module which comprises fluid-guiding elements could be used in order to produce a filter element of the type described here. This makes it possible for existing filter elements without fluid-guiding elements to be equipped with fluid-guiding elements so as to render effective fluid cleaning possible.

The module may be made available, and supplied, in the form of a retrofittable component or retrofittable kit.

The fluid-guiding elements avoid the situation where turbulence is produced. Turbulence gives rise to differences in pressure, condensation effects and noise development.

Filter elements of the type described here are used in air filtration, in particular in intake-air filtration of turbomachinery or in ventilation and air conditioning.

DETAILED DESCRIPTION

Figure 1:
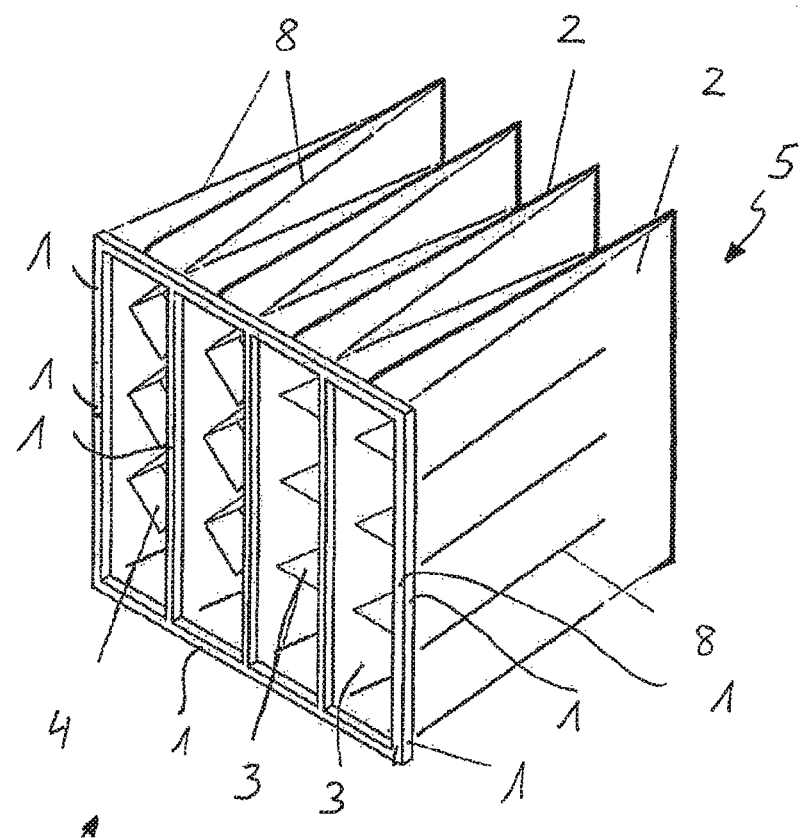
FIG. 1 shows a prior-art filter element designed in the form of a pocket filter.

FIG. 1 shows a prior-art filter element comprising a frame 1 and bag-like filter pockets 2 connected thereto, wherein the filter pockets 2, on the inflow side, have openings 3 so that a fluid which is to be filtered can enter into the interior spaces 4 of the filter pockets, and wherein the interior spaces 4 taper in the direction of an outflow side 5.

Figure 2:
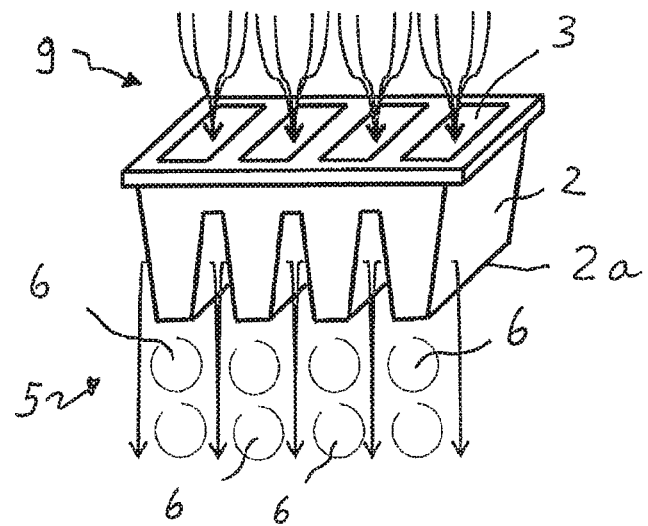
FIG. 2 shows a prior-art filter element designed in the form of a pocket filter along with a vortex-forming flow field on the outflow side.

FIG. 2 shows that vortices 6 form on the outflow side 5 of a prior-art filter element. The vortices 6 form beneath the pointed ends or edges of the filter pockets 2 and result in an undesired loss in pressure between the inflow side 9 and outflow side 5.

Figure 3:
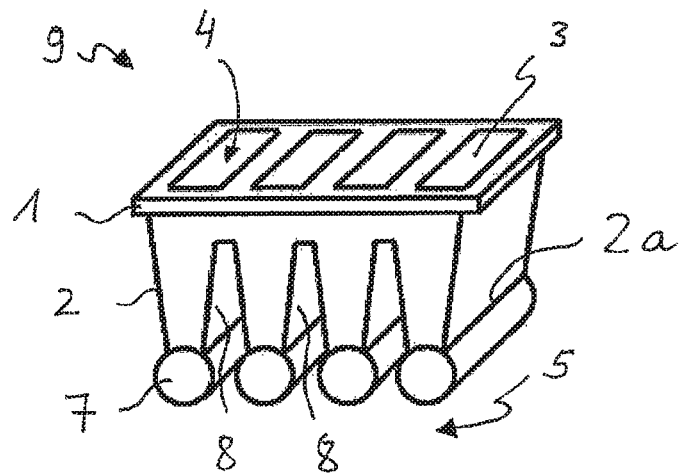
FIG. 3 shows a schematic view of a filter element which has tubular fluid-guiding elements.

FIG. 3 shows a filter element according to the invention, in the case of which fluid-guiding elements 7 are arranged on the outflow side 5 of the filter pockets 2.

The fluid-guiding elements 7 are partially circular in cross section. In specific terms, the fluid-guiding elements 7 are configured in the form of tubes, or are tubular, and adjoin the pointed ends of the filter pockets 2.

Figure 4:
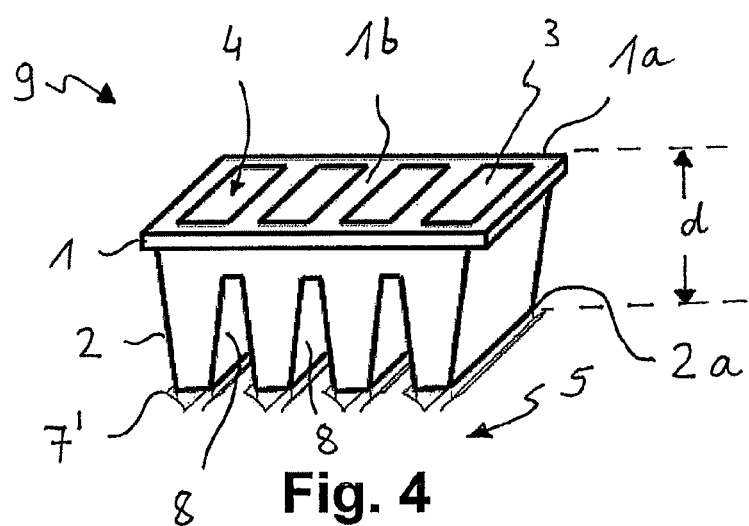
FIG. 4 shows a schematic view of a further filter element, which has fluid-guiding elements configured in the form of air baffle plates.

FIG. 4 shows a further filter element according to the invention, in the case of which fluid-guiding elements 7' are arranged on the outflow side 5 of the filter pockets 2.

The fluid-guiding elements 7' are designed as air baffle plates. The air baffle plates are concave in the direction of the outflow side 5. Two air baffle plates are assigned to each filter pocket 2.

The fluid-guiding elements 7, 7' may also be configured as separate components which can be removed from the filter element or can be connected to the same. The fluid-guiding elements 7, 7' are arranged on the frame 1, but could also be arranged separately from the same.

The filter pockets 2 have folded walls 8, wherein the walls 8 have pleating. The filter pockets 2 are produced from nonwoven fabric.

FIG. 4 shows that the fluid-guiding elements 7' maintain a spacing of not more than 5 d from the inflow-side upper edge 1a of the frame 1, where d represents the distance which runs from the inflow-side upper edge 1a to the outflow end 2a of the filter pockets 2. The distance runs orthogonally to the inflow plane 1b, which is defined by the frame 1.

Said spacing is also possible in an analogous manner for the filter elements of FIGS. 3 and 5 to 7.

Figure 5:
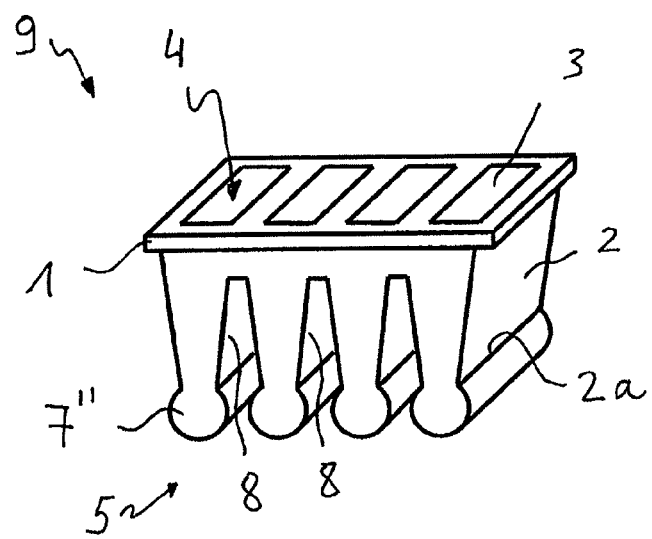
FIG. 5 shows a schematic view of a filter element which has tubular fluid-guiding elements which are formed in one piece with the frame.

FIG. 5 shows a filter element according to the invention, in the case of which fluid-guiding elements 7" are arranged on the outflow side 5 of the filter pockets 2. These fluid-guiding elements 7" are connected in one piece to the frame 1.

The fluid-guiding elements 7" are partially circular in cross section. In specific terms, the fluid-guiding elements 7" are configured in the form of tubes, or are tubular, and adjoin the pointed or blunt ends 2a of the filter pockets 2.

Figure 6:
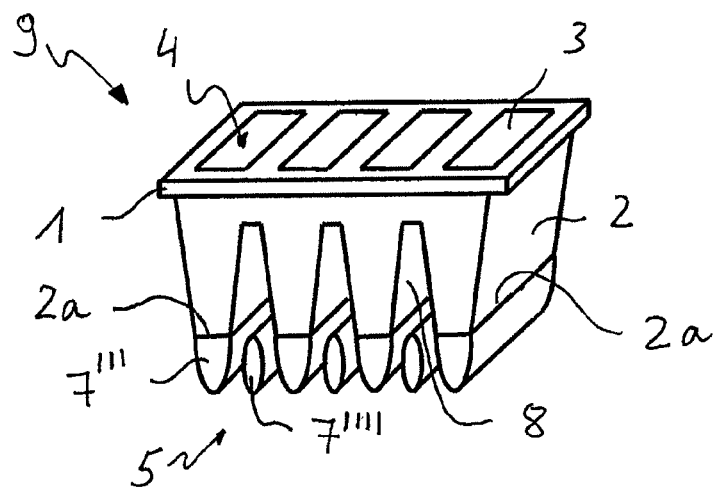
FIG. 6 shows a schematic view of a further filter element, which has first fluid-guiding elements, which are of droplet-like configuration, and further, separate fluid-guiding elements, which are arranged between the first fluid-guiding elements.

FIG. 6 shows a filter element according to the invention, in the case of which fluid-guiding elements 7''', 7'''' are arranged on the outflow side 5 of the filter pockets 2.

First fluid-guiding elements 7''' are fastened at the ends 2a of the filter pockets 2. The first fluid-guiding elements 7''' are at least partially or wholly of droplet-like configuration in cross section.

Second fluid-guiding elements 7'''' are positioned as separate components between the first fluid-guiding elements 7'''.

The second fluid-guiding elements 7'''' are oval or elliptical in cross section.

First fluid-guiding elements 7''' are arranged at the outflow ends 2a of the filter pockets 2 and second fluid-guiding elements 7'''' are arranged as separate components between the walls 8 and between the outflow ends 2a of the filter pockets 2.

Figure 7:
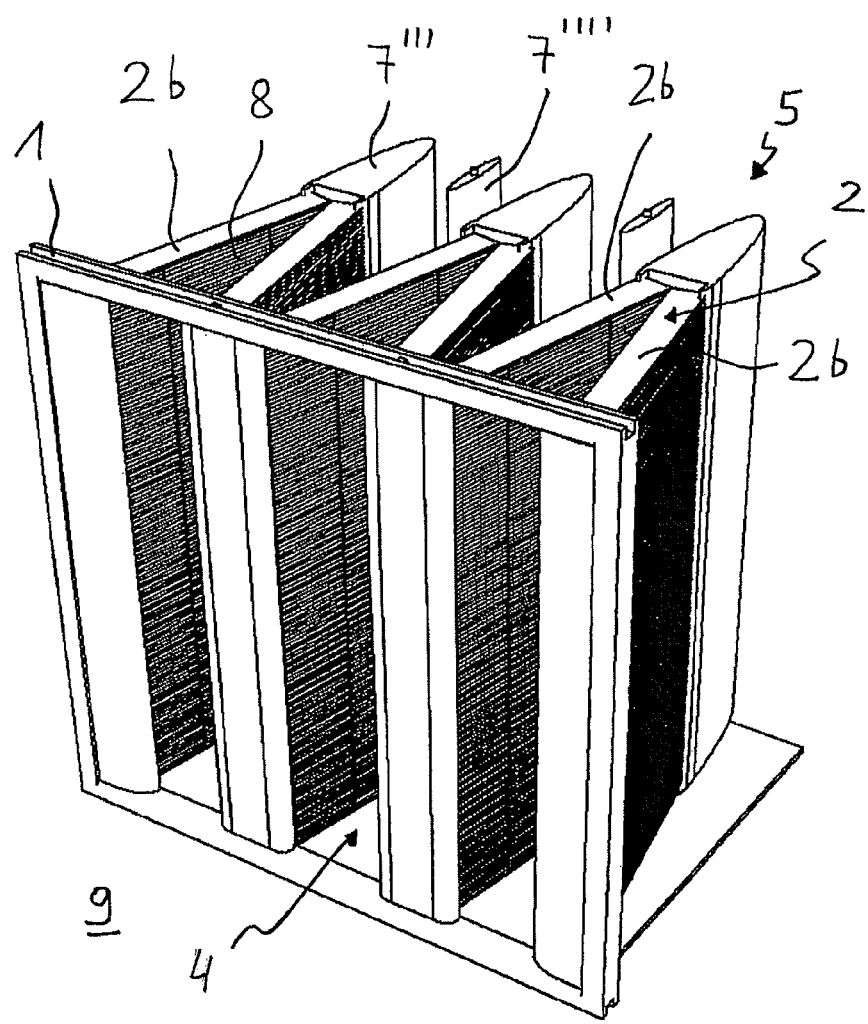
FIG. 7 shows a view of a further filter element, the frame of which is assigned flat pleated filter elements which form the filter pockets, wherein first fluid-guiding elements of droplet-like configuration are provided, and wherein further, separate fluid-guiding elements, which are arranged between the first fluid-guiding elements, are provided.

FIG. 7 shows a filter element according to the invention, in the case of which fluid-guiding elements 7''', 7'''' are arranged on the outflow side 5 of the filter pockets 2.

A wall 8 of a filter pocket 2 is formed by one flat filter element 2b, which is arranged on the frame 1 with inclination at an acute angle in relation to another filter element 2b.

The flat filter elements 2b are folded, produced from nonwoven fabric and form the walls 8 of the filter pocket 2.

To this extent, the filter pockets 2 have folded walls 8, wherein the walls 8 have pleating.

First fluid-guiding elements 7''' are fastened at the ends of the filter pockets 2. The first fluid-guiding elements 7''' are of droplet-like configuration in cross section.

Second fluid-guiding elements 7'''' are positioned as separate components between the first fluid-guiding elements 7'''.

The second fluid-guiding elements 7'''' are oval or elliptical in cross section.

With reference to FIGS. 3 to 7, it should be explained here that pointed ends 2a or edges may also be of rounded, frustoconical or flattened design, as long as they taper in the outflow direction. The fluid-guiding elements 7, 7', 7'', 7''', 7'''' extend along these ends 2a or parallel to the same. The fluid-guiding elements 7, 7', 7'', 7''', 7'''' are configured in the form of elongate bodies.

What is claimed is:

1. A filter element having an outflow side and an inflow side, the filter element comprising:
    a frame; and
    bag-like filter pockets connected to the frame, the bag-like filter pockets having an inflow side and an outflow side oriented towards the inflow and outflow sides of the filter element, respectively; wherein:
    each of the bag-like filter pockets comprises at least one wall that defines an interior space of a respective one of the bag-like filter pockets, such that the interior space tapers in a direction of an outflow side of the bag-like filter pockets;
    the at least one wall of the bag-like filter pockets comprises an inflow surface oriented towards the inflow side of the bag-like filter pockets and an outflow surface oriented towards the outflow side of the bag-like filter pockets;
    each of the bag-like filter pockets comprise at least one opening so that a fluid which is to be filtered can enter into the interior space thereof from the inflow side of the filter element; and
    the filter element further comprises fluid-guiding elements arranged on the outflow side of said bag-like filter pockets.

2. The filter element as claimed in claim 1, wherein the fluid-guiding elements are at least partially curved or arcuate.

3. The filter element as claimed in claim 1, wherein the fluid-guiding elements are at least partially circular in cross section.

4. The filter element as claimed in claim 1, wherein the fluid-guiding elements are air baffle plates.

5. The filter element as claimed in claim 1, wherein the fluid-guiding elements are separate components that are each releaseably coupled to the outflow surface of the at least one wall of a respective one of the bag-like filter element.

6. The filter element as claimed in claim 1, wherein:
    each of the bag-like filter pockets taper to a pointed end in a direction towards the outflow side of the filter element;
    each of the fluid-guiding elements are arranged on a respective one of the pointed ends of the bag-like filter pockets.

7. The filter element as claimed in claim 1, wherein:
    said fluid guiding elements comprise first fluid-guiding elements and second fluid-guiding elements;
    each of said first fluid-guiding elements is arranged on the outflow surface of the at least one wall of a respective one of said bag-like filter pockets; and
    each of said second fluid-guiding elements is arranged between at least two of said bag-like filter pockets on an outflow side of said filter element.

8. The filter element as claimed in claim 1, wherein the fluid-guiding elements and the frame are formed in one piece, such that the frame and the fluid guiding elements are integral with one another.

9. The filter element as claimed in claim 1, wherein:
    the frame comprises an inflow-side upper edge;
    the fluid guiding elements comprise an outflow end; and
    the fluid-guiding elements maintain a spacing of not more than 5 d from the inflow-side upper edge, where d represents the distance which runs from the inflow-side upper edge to the outflow end of each of the bag-like filter pockets.

10. The filter element as claimed in claim 1, wherein each of the bag-like filter pockets have folded walls, wherein the folded walls have pleating.

11. The filter element as claimed in claim 10, wherein the at least one wall of each of said bag-like filter pockets is formed by a flat filter element.

12. A module comprising fluid-guiding elements for producing a filter element as claimed in claim 1.

13. The filter element of claim 8, wherein the frame and the bag-like fluid filter pockets are formed from the same material.

* * * * *